May 24, 1960 W. A. WADSWORTH 2,937,810

DIGITAL COMPUTER CIRCUIT

Filed June 28, 1957 2 Sheets-Sheet 1

INVENTOR
W. A. WADSWORTH
BY
Alan C. Rose
ATTORNEY

INVENTOR
W. A. WADSWORTH
BY Alan C. Rose
ATTORNEY

United States Patent Office 2,937,810

Patented May 24, 1960

2,937,810

DIGITAL COMPUTER CIRCUIT

William A. Wadsworth, Towaco, N.J., assignor to Bell Telephone Laboratories, Incorporated, New York, N.Y., a corporation of New York Filed June 28, 1957, Ser. No. 669,910

13 Claims. (Cl. 235—165)

The present invention relates to serial digital computing systems, and more particularly to apparatus for avoiding round-off errors in such systems.

When digital computers are employed to perform integration operations, a number of successive increments are summed to produce the result. Now, when a large number of increments are summed, the individual increments may each be rounded off prior to summing, and this can produce significant cumulative errors. Various techniques for avoiding such errors have been proposed heretofore. For example, in binary computers which are normally capable of handling numbers having a predetermined number of digits, "double precision" calculating has been employed for the calculation and retention of double length numbers. While such techniques serve to avoid round-off errors, they are exceedingly wasteful of time and equipment. Systematic round-off systems involving the "stuffing" of a binary "1" or "0" in the least significant place have also been proposed. However, it has been determined that cumulative errors may be introduced by this technique.

The principal object of the present invention is to effectively control round-off errors in repetitive calculating operations, while using as little extra time and equipment as possible.

In accordance with the present invention, this object is realized by computing each increment on an expanded scale, and then reducing the scale of the increment. The more significant digits of successive increments are added together, and the less significant digits are stored as round-off information. By employing a delay line several digit periods in length which may be selectively by-passed in conjunction with a computer arithmetic unit, the extraction of round-off information and the scaling down process may be accomplished in the time required for a single addition operation.

It is a feature of the invention that an arithmetic unit for processing serial binary numbers is provided with a delay loop including a delay line having several digit periods of delay, and a switching circuit is provided for selectively scaling down the significance of a number being processed in the arithmetic unit by by-passing the delay line, or by inserting such a delay line into the delay loop. Circuitry is also provided for concurrently routing the less significant digits of the number to storage as round-off information.

In accordance with further features of the invention, the system may include a storage circuit for storing the sum of successive numbers on a given scale, a source for providing binary input information on an expanded scale coupled to the arithmetic unit, and circuitry for adding the round-off information to successive numbers derived from said source prior to the scaling down operation.

In accordance with a collateral feature of the invention, the binary system described in the preceding paragraphs may operate in accordance with the so-called "fractional" binary number system and may include circuitry for filling in the more significant digit places of the scaled down number and the round-off information with the sign bit of the number being processed in the arithmetic unit. These additional sign fill-in circuits facilitate the scaling down operation and the retention of round-off information, within the limitations of a fractional binary numbering system.

A complete understanding of this invention and of these and other features thereof may be gained from a consideration of the following detailed description and the accompanying drawing, in which.

Figure 1:
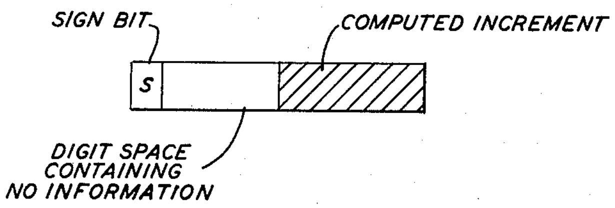
Fig. 1 is a diagram of a binary number.

Referring more particularly to the drawings, Fig. 1 is a diagrammatic illustration of a binary number. The number indicated in Fig. 1 is employed in a computing process in which many increments of the type shown in Fig. 1 are added to produce a final result. Such an operation is employed in integration operations in digital computers, for example, and is commonly employed in distance calculations in real time computers. In distance calculations, the distance traveled may be expressed by the following integral:

$$D=\int_{t_1}^{t} V\cdot dt \qquad (1)$$

where D is the total distance, V is the velocity, and $t$ represents time. Assuming that each increment of velocity is computed in a computer cycle which is $t_c$ seconds long, then the following equation obtains:

$$\Delta D=t_c\cdot V \qquad (2)$$

By adding successive values of the distance increment ΔD over the time interval from $t_1$ to $t$, the integral indicated in Equation 1 may be evaluated.

In Fig. 1, a distance increment is shown in the scale desired in the final sum. As indicated in Fig. 1, this leaves a number of digits between the sign bit and the computed increment which contain no information. In addition, none of the round-off information, which would normally appear to the right of the computed increment, is included in the computer increment.

Figure 2:
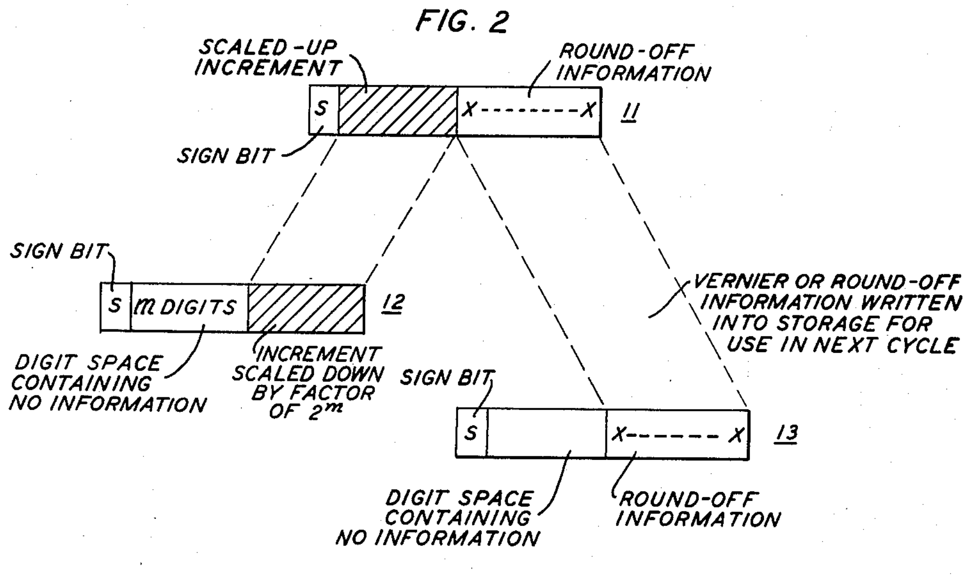
Fig. 2 is a diagram indicating a scaling down operation and the retention of round-off information derived from a binary number.

The disadvantages of the technique described above in connection with Fig. 1 are avoided in large measure by the arrangements indicated schematically in Fig. 2. As indicated at 11 in Fig. 2, the successive increments may be computed on a scaled up basis. That is, the increments are computed on a scale which is expanded with respect to the fixed number of digits represented by computer words, as compared with the scaling of the final sum. For example, a given distance is represented by a significantly larger number in the scaled up increments than it is in the intermediate or in the final sum.

When this technique is employed, the scaled up increment appears in the digit space shown in Fig. 1 as containing no information. In addition, a number of less significant digit places are available for the inclusion of round-off information. This round-off information is employed to prevent the accumulation of errors which might otherwise occur through the dropping of less significant digits.

Following the calculation of the scaled up increment together with the round-off information as indicated at 11 in Fig. 2, the computed increment to the desired number of significant digits is scaled down, as indicated at 12 in Fig. 2. Simultaneously with the scaling down of the desired increment, the round-off information is extracted to storage, as indicated at 13 in Fig. 1. This round-off information 13 is added to the next successive computed increment before the scaling down operation, thus maintaining full accuracy in the increments which are added to the final sum.

In Fig. 2 it will be assumed that the scaled down increment 12 includes *m* digit slots between the sign bit and the information bearing digits of the increment. Under these circumstances, the scaling factor is $2^m$. The sum (or the integral in the example noted above) is therefore stored and increments are added to it on a scale which is $2^m$ times greater than that upon which successive increments are initially provided.

Figure 3:
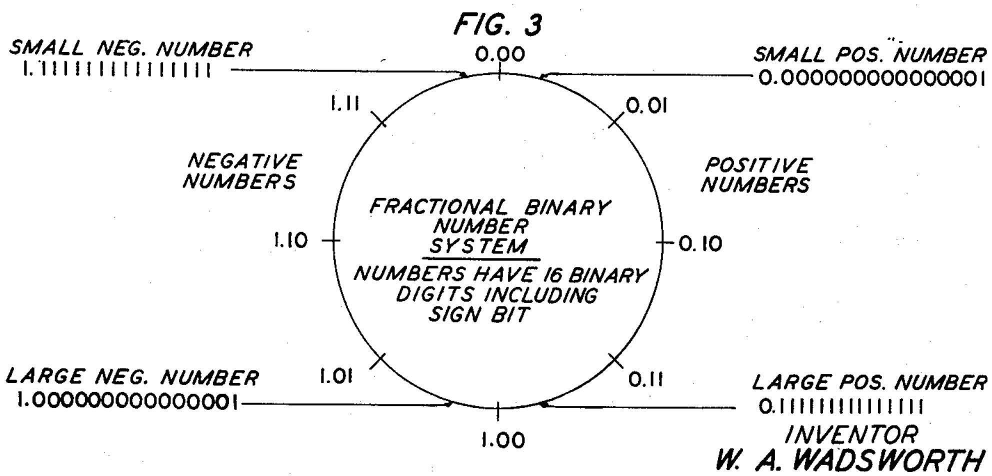
Fig. 3 is a diagram representing the fractional binary numbering system.

Before considering the circuit by which the operation discussed above is instrumented, a brief discussion of the numbering system employed in the present computer is appropriate. Fig. 3 shows diagrammatically the fractional number system employed in the computing circuitry of Fig. 4 which will be described later. This numbering system has a range of from +1 to −1. In the diagram of Fig. 3 positive numbers appear to the right and negative numbers appear to the left. The sign of the fractional number appears to the left of the binary point. Thus, all positive numbers are prefixed by a "0," and all negative numbers are prefixed by a "1" to the left of the binary point. The largest negative number which may be represented in the computer system is 1.000000000000001 and the largest positive number is 0.111111111111111. Both the large positive numbers and the large negative numbers therefore approach the number "1" as a limit. It may also be noted that the numbers which are employed in the present system all include sixteen binary digits including the sign bit.

Figures 4, 5:
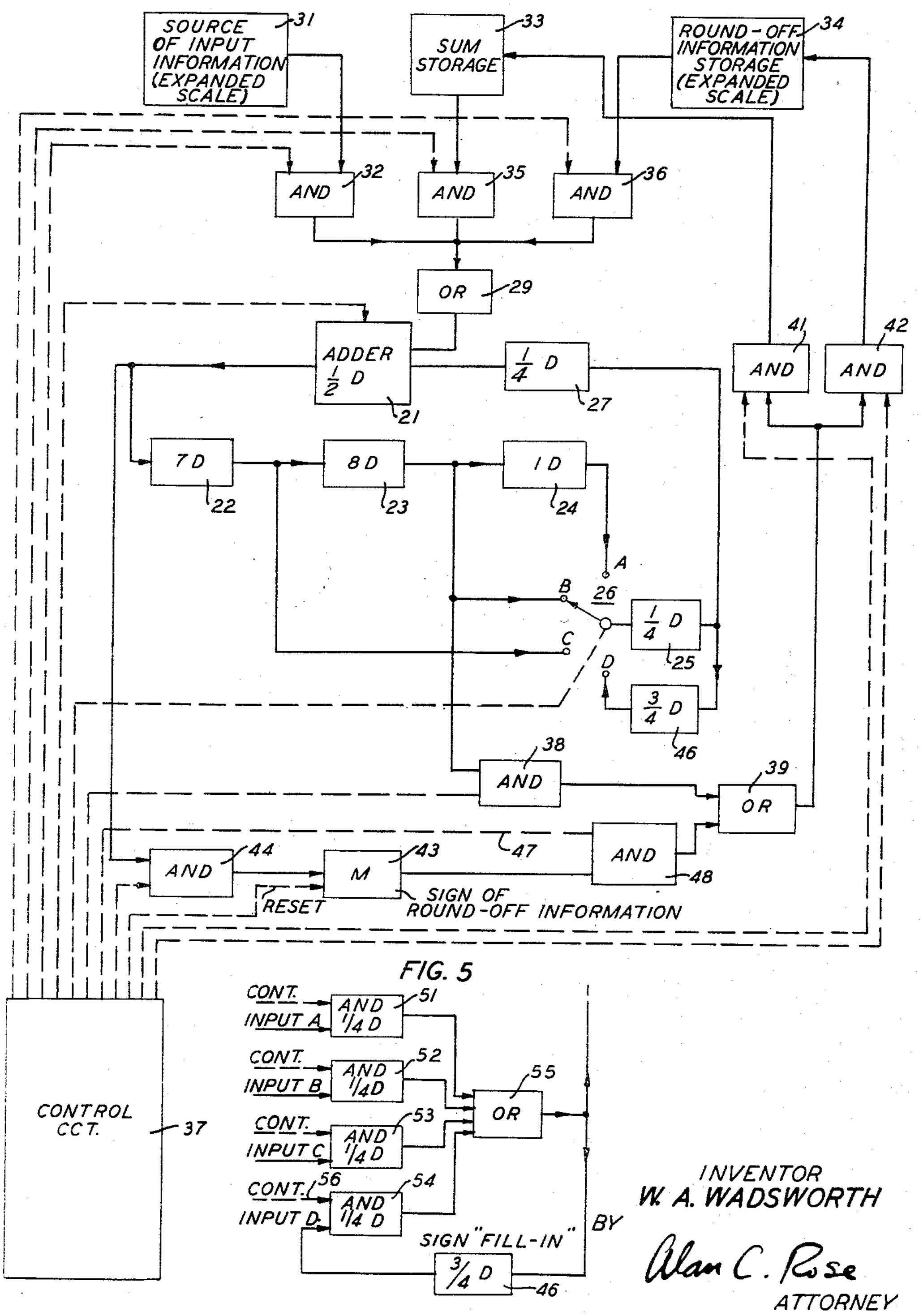
Fig. 4 is a block circuit diagram of an illustrative embodiment of the invention.
Fig. 5 is a logic circuit diagram showing an implementation of a switching circuit included in Fig. 4.

Fig. 4 is a block diagram showing an illustrative computer instrumentation of the technique described above, and shown diagrammatically in Fig. 2. The system of Fig. 4 is a serial binary computer. An important component of the computer system is the adder 21. Suitable adder circuits are well known in the art and are disclosed, for example, in chapter 4 of a text, entitled "Arithmetic Operations in Digital Computers," by R. K. Richards, D. Van Nostrand Company, Inc., Princeton, New Jersey, 1955. Associated with the adder 21 are several delay loops, including the delay circuits 22, 23, 24, 25, and 27, and a switching circuit 26 for selecting the desired delay loop. Various arithmetic operations may be performed in the circuitry including the adder 21 and its associated delay loops. For example, a sixteen-bit number may be circulated through the delay loop including the adder 21, the seven-digit period delay circuit 22, the eight-digit period delay circuit 23, and the one-quarter digit period delay circuits 25 and 27 when the switching circuit 26 is set to the position B. An additional number can then be gated from the OR circuit 29 to the adder 21. The sum of the two numbers is then circulated through the adder and its associated delay line. Various numbers may be applied to the adder through the OR unit 29. For example, input information from the source 31 may be gated through the AND unit 32 to the OR unit 29. Similarly, signals from the storage circuits 33 and 34 may be gated through the AND circuits 35 and 36, respectively, to the OR unit 29, and then to the adder circuit 21.

The pulses for controlling the various gates which appear throughout the circuit of Fig. 4 are provided by the control circuit 37 in the lower left-hand corner of Fig. 4. The control circuit provides properly timed pulses to the circuits shown in Fig. 4 to enable them to perform the functions which will be described. Techniques for implementing the control circuit 37 are well known in the art. Control circuits of this type often include a plurality of ring counters operating at different speeds, with a source of clock pulses being applied to the fastest ring counter. As the fastest ring counter completes a cycle, a pulse is applied to the next slower ring counter, and so forth. By employing coincidence gates coupled to appropriate stages of each ring counter, a pulse may be obtained in any desired time slot or series of time slots in the computer cycle. Other known techniques for obtaining control signals at desired time intervals for use in a serial data processing apparatus are also well known in the art and are disclosed, for example, in chapter 11 of the text by R. K. Richards cited above.

When it is desired to remove numbers from the delay loop associated with the adder 21, the AND circuit 38, the OR circuit 39, and the two AND circuits 41 and 42 are employed. Thus, with enabling signals being supplied from the control circuit 37 to the AND circuits 38 and 41, signals may be directed from the delay loop to the sum storage circuit 33. Similarly, when the AND gates 38 and 42 are enabled, information from the delay loop may be stored in the round-off storage circuit 34.

The operation of the circuit of Fig. 4 will first be described briefly and immediately thereafter in somewhat greater detail. Briefly, a cycle of operation of the specific embodiment of my invention shown in Fig. 4 is as follows. An increment to be added to the partial sum is applied from source 31 to the adder 21 with the information bits filling substantially all of the the digit positions, as indicated at 11 in Fig. 2. The prior round-off information from the storage circuit 34 is added to the increment in the adder circuit 21. The resulting number is then separated into two parts. The information bits in the less significant digit places, constituting the new round-off information, are routed to the storage circuit 34. The information bits in the more significant digit positions are shifted with respect to the over-all time standard of reference of the system to the digit positions of lesser significance and are returned to adder 21. The partial sum from the storage circuit 33 is then added to the scaled down increment, as altered by the round-off information, in the adder circuit 21; the augmented partial sum is then returned to the storage circuit 33, and the adder circuit 21 and its associated delay circuits are ready for the next increment from source 31.

Now, considering the circuitry of Fig. 4 in somewhat greater detail, it will be assumed initially that the sum of a number of increments forming a partial integral is stored in circuit 33. Round-off information which is also derived from previous cycles of operation is stored in circuit 34. In addition, it will be assumed that the delay loop associated with the adder circuit 21 is cleared, and that the switching circuit 26 is in position B. An additional increment from the source 31 is then gated through the AND circuit 32 and the OR circuit 29 to the adder 21. While the information is in the arithmetic unit including the adder 21 and its associated circuitry, various operations may be performed. For example, it could be multiplied or divided by another binary number, or additional information from another source could be added to it. Incidentally, it may be noted that the single digit delay circuit 24 is provided for division operations in which successive shifts of one digit place are required.

Following such possible additional operations, the round-off information in the storage circuit 34 is gated through the AND circuit 36 by an appropriately timed pulse from the control circuit 37, and is transmitted through the OR circuit 29 to the adder 21. The round-off information serves to correct the increment by the addition of the residue from previous increments.

Following the addition of round-off information, it is desired to scale down the increment which is represented on an expanded scale and to extract the round-off information and apply it to the storage circuit 34. For convenience, the term "increment" is still employed even though it may be modified from the original form in which it appeared at the output of circuit 31. The scaling down operation is indicated schematically in Fig. 2. The first step in this operation involves storing the sign bit of the increment in the memory circuit 43. This is accomplished by applying a gating pulse to the AND circuit 44 at the instant when the sign bit is at the output of the adder 21. The sign of the increment is then gated through to memory circuit 43.

As the scaled up increment, together with the associated round-off information, passes through the delay loop with the least significant digit first, the switching circuit 26 is switched from position B to position C just before the least significant digit emerges from the delay line 23. Concurrently, a series of eight pulses is applied to the AND units 38 and 42 to gate the round-off information to the storage circuit 34. By by-passing the delay line 23, the scaled up increment is reduced in significance, as indicated at 12 in the diagram of Fig. 2. The resulting situation, therefore, is that the scaled down increment is circulating in the delay loop associated with the adder circuit 21, and the round-off information is stored in circuit 34.

In the foregoing description, the signs of the scaled down increment and the round-off information have been ignored. Before describing the technique for handling these signs, it is helpful to refer to the diagram of Fig. 3, in which the fractional numbering system employed in the present computer is illustrated. As shown in Fig. 2, in the process of scaling down the increment from 11 to 12, the resultant scaled down number has been converted into relatively small number. In the diagram of Fig. 3, it may be noted that small numbers characteristically are prefixed by a group of digits which are the same as the sign of the small number. It may also be noted once more that serial binary numbers are handled in the computer with the least significant bit first, and the sign bit last.

Now, referring to Fig. 4, when the switching circuit 26 by-passed the delay line 23, the effect was to eliminate the round-off information in the number 11 of Fig. 2, and to apply the scaled down increment and the sign bit to the delay circuit 25. To complete the scaled down increment, it would be desirable to repeat the sign bit and fill out the more significant places in the scaled down increment. This is accomplished in the circuit of Fig. 4 by switching the circuit 26 from position C to position D. By this operation, the sign bit is circulated in the local delay loop including delay circuits 25 and 46 for eight additional digit periods. The switching circuit 26 then completes the delay loop through position B and circulates the scaled down increment through the adder 21 and the delay circuits 22, 23, 25, and 27.

As mentioned above, the sign of the original increment was stored in the memory circuit 43. This is, of course, also the sign of the round-off information. Following the application of eight bits of round-off information to the round-off storage circuit 34, a series of eight pulses is applied to the control input lead 47 of the AND unit 48. This operation fills out the more significant digit places of the number representing round-off information with the sign bit stored in the memory cell 43.

Following the scaling down operation, it has been noted above that the scaled down increment is circulating in the sixteen-bit delay loop associated with the adder circuit 21. The partial integral in the sum storage circuit 33 is now gated through the AND circuit 35 and the OR circuit 29, and is added to the scaled down increment in the adder circuit 21. The resultant sum is subsequently returned to the storage circuit 33 by the enabling of AND circuits 38 and 41.

The switching circuit 26 may be instrumented as indicated in Fig. 5. The switching circuit of Fig. 5 includes the four AND circuits 51 through 54 and the OR circuit 55. By energizing the control lead associated with one of the AND circuits 51 through 54, any desired input signal may be selected. For example, when the control lead 56 associated with the AND circuit 54 is enabled, pulses circulate through the one-digit delay loop including the AND circuit 54, the OR circuit 55, and the delay circuit 46. This is the familiar sign "fill-in" operation mentioned above.

In the circuit of Fig. 4, the circuits have been shown in block and logic diagram form. The logic circuits may be implemented in any of a large number of known technologies which have been described in texts and articles on computer circuits. For specific example, the circuits shown in an article, entitled "Regenerative Amplifier for Digital Computer Applications," by J. H. Felker, which appeared at pages 1584 through 1596 of the November 1952 issue of the Proceedings of the I.R.E. (volume 40, No. 11), may be employed. In this technology, the AND circuits include pulse regenerators which introduce one-quarter digit periods of delay. Thus, the one-quarter digit period delay circuit 25 in Fig. 4 actually represents the delay introduced by one of the AND circuits 51 through 54 of Fig. 5. The memory circuits, such as circuit 43 of Fig. 4, are one-digit period delay loops which also include pulse regenerators.

Summarizing the advantages of the present invention, it may be noted that I have provided an apparatus for completely avoiding cumulative round-off errors for repetitive calculating operations. Furthermore, this has been accomplished without the use of apparatus requiring double length numbers or the time consuming digit-by-digit shifting processes which have been proposed heretofore. The apparatus involves the use of a switching arrangement for by-passing a delay line including several digit periods of delay in an accumulator delay loop. It also contemplates the use of the associated circuitry required for maintaining proper signs for both the scaled down increment and the retained round-off information.

It is to be understood that the above-described arrangements are illustrative of the application of the principles of the invention. Numerous other arrangements may be devised by those skilled in the art without departing from the spirit and scope of the invention.

What is claimed is:

1. A serial digital circuit for summing successive increments, comprising means for storing an intermediate sum on a predetermined digital scale, means for supplying serial binary digital input signals representing successive increments on a digital scale which is expanded with respect to said predetermined scale by a factor of $2^m$, where $m$ is an integer greater than 1, computer circuit means for processing said increments during successive summing cycles, means for storing round-off information on said expanded scale, means for adding said round-off information to said increments during successive cycles, a delay loop connected to said computer circuit means, a delay circuit having $m$ digit periods of delay included in said delay loop, switching means for by-passing said delay circuit to reduce the scale of the increment, means for inserting the sign bit from said increment in the $m+1$ most significant digit places of said reduced increment, means for adding said intermediate sum to the reduced increment, and means for storing the remaining digits of said increment which were not added to said intermediate sum simultaneously with the said scale reducing operation, said remaining digits constituting round-off information to be added to the next subsequent increment.

2. A serial digital circuit for performing a repetitive arithmetic operation by summing successive increments, comprising means for storing an intermediate sum on a predetermined digital scale, means for supplying serial binary digital input signals representing successive increments on a digital scale which is expanded with respect to said predetermined scale by a factor of $2^m$, where $m$ is an integer greater than 1, computer circuit means for processing said increments during successive cycles of said repetitive arithmetic operation, means for storing round-off information on said expanded scale, means for adding said round-off information to said increments during successive cycles, a delay loop connected to said computer circuit means, a delay circuit having $m$ digit periods of delay included in said delay loop, switching means for by-passing said delay circuit to reduce the scale of the increment, means for adding said intermediate sum to the reduced increment, and means for storing the remaining digits of said increment which were not added to said intermediate sum simultaneously with the scaling down of the more significant digits of said increment, said remaining digits constituting round-off information to be added to the next subsequent increment.

3. A serial digital circuit for performing a repetitive arithmetic operation by summing successive increments, comprising means for storing an intermediate sum on a predetermined digital scale, means for supplying serial binary digital input signals representing successive increments on a digital scale which is expanded with respect to said predetermined scale by a factor of $2^m$, where $m$ is an integer greater than 1, computer circuit means for processing said increments during successive cycles of said repetitive arithmetic operation, means for storing round-off information on said expanded scale, means for adding said round-off information to said increments during successive cycles, a delay loop connected to said computer circuit means, a delay circuit having $m$ digit periods of delay included in said delay loop, switching means for by-passing said delay circuit to reduce the scale of the increment, means for adding said intermediate sum to the reduced increment, and means for storing the remaining digits of said increment which were not added to said intermediate sum during the word period in which said switching means is operated to by-pass said delay circuit, said remaining digits constituting round-off information to be added to the next subsequent modified increment.

4. A serial digital circuit for performing a repetitive arithmetic operation by summing successive increments, comprising means for storing an intermediate sum on a predetermined digital scale, means for supplying serial binary digital input signals representing successive increments on a digital scale which is expanded with respect to said predetermined scale by a factor of $2^m$, where $m$ is an integer greater than 1, computer circuit means for processing said increments during successive cycles of said repetitive arithmetic operation, means for storing round-off information on said expanded scale, means for adding said round-off information to said increments during successive cycles, a delay loop connected to said computer circuit means, a delay circuit having $m$ digit periods of delay included in said delay loop, switching means for by-passing said delay circuit to reduce the scale of the increment, means for inserting the sign bit from said increment into the sign digit place of said reduced increment, means for adding said intermediate sum to the reduced increment, and means for storing the remaining digits of said increment which were not added to said intermediate sum simultaneously with the scaling down of the more significant digits of said increment, said remaining digits constituting round-off information to be added to the next subsequent increment.

5. A serial digital circuit for performing a repetitive arithmetic operation by summing successive increments, comprising means for storing an intermediate sum on a predetermined digital scale, means for supplying serial binary digital input signals representing successive increments on a digital scale which is expanded with respect to said predetermined scale by a factor of $2^m$, where $m$ is an integer greater than 1, computer circuit means for processing said increments during successive cycles of said repetitive arithmetic operation, means for storing round-off information on said expanded scale, means for adding said round-off information to said increments during successive cycles, a delay loop connected to said computer circuit means, a delay circuit having $m$ digit periods of delay included in said delay loop, switching means for by-passing said delay circuit to reduce the scale of the increment, means for adding said intermediate sum to the reduced increment, and means for storing the remaining digits of said increment which were not added to said intermediate sum within one word period of the time at which said switching means is operated to by-pass said delay circuit, said remaining digits constituting round-off information to be added to the next subsequent increment.

6. A serial digital circuit for performing a repetitive arithmetic operation by summing successive increments, comprising means for storing an intermediate sum on a predetermined digital scale, means for supplying serial binary digital input signals representing successive increments on a digital scale which is expanded with respect to said predetermined scale by a factor of $2^m$, where $m$ is an integer greater than 1, computer circuit means for processing said increments during successive cycles of said repetitive arithmetic operation, means for storing round-off information on said expanded scale, means for adding said round-off information to said increments during successive cycles, a delay loop connected to said computer circuit means, a delay circuit having $m$ digit periods of delay included in said delay loop, switching means for by-passing said delay circuit to reduce the scale of the increment, means for inserting the sign bit from said increment in the $m+1$ most significant digit places of said reduced increment, means for adding said intermediate sum to the reduced increment, and means for storing the remaining digits of said increment which were not added to said intermediate sum simultaneously with the scaling down of the more significant digits of said increment, said remaining digits constituting round-off information to be added to the next subsequent increment.

7. A serial digital circuit for performing a repetitive arithmetic operation by summing successive increments, comprising means for storing an intermediate sum on a predetermined digital scale, means for supplying serial binary digital input signals representing successive increments on a digital scale which is expanded with respect to said predetermined scale by a factor of $2^m$, where $m$ is an integer greater than 1, computer circuit means for processing said increments during successive cycles of said repetitive arithmetic operation, means for storing round-off information on said expanded scale, means for adding said round-off information to said increments during successive cycles, a delay loop connected to said computer circuit means, a delay circuit having $m$ digit periods of delay, switching means for selectively by-passing said delay circuit or inserting it into said delay loop, means for actuating said switching means to reduce the scale of said increment, means for adding said intermediate sum to the reduced increment, and means for storing the remaining digits of said increment which were not added to said intermediate sum within a word period of the time during which said switching means is actuated to reduce the scale of the increment, said remaining digits constituting round-off information to be added to the next subsequent modified increment.

8. A serial digital circuit for performing a repetitive arithmetic operation by summing successive increments, comprising means for storing an intermediate sum on a predetermined digital scale, means for supplying serial binary digital input signals representing successive increments on a digital scale which is expanded with respect to said predetermined scale by a factor of $2^m$, where $m$ is an integer greater than 1, computer circuit means for processing said increments during successive cycles of said repetitive arithmetic operation, means for storing round-off information on said expanded scale, means for adding said round-off information to said increments during successive cycles, a delay loop connected to said computer circuit means, a delay circuit having *m* digit periods of delay included in said delay loop, switching means for by-passing said delay circuit to reduce the scale of the increment, means for storing the remaining digits of said increment concurrently with said scale reduction operation, said remaining digits constituting round-off information to be added to the next subsequent increment, means for filling in the more significant digit places of said reduced increment with the sign bit of said increment, means for filling in the more significant digit places of said roundoff information with the sign bit of said increment, and means for adding said intermediate sum to the reduced increment.

9. A combination as defined in claim 8 wherein said sign fill-in means for said reduced increment includes a one-digit period delay loop and switching means for circulating the sign bit from said original increment in said one-digit period delay loop for a plurality of digit periods.

10. An electrical circuit for performing successive computations comprising an arithmetic unit including an adder, sum circuit means for storing numbers on a predetermined digital scale, means for providing binary digital increments in said adder on an expanded scale with respect to said predetermined scale, a round-off information storage circuit, means for adding numbers from said round-off storage means to said increments in said arithmetic unit, means for applying the information bits in the less significant digit positions from said adder to said round-off storage means, means for shifting the scale of the remaining most significant digits in said arithmetic unit to said predetermined scale, means for routing said remaining digits back to said adder, means for adding the number in said sum storage means to the said remaining digits of said increment in said adder, and means for applying the modified sum back to said sum storage circuit.

11. In combination, an arithmetic unit including an adder, a source of input information, sum circuit means for storing numbers on a predetermined digital scale, a round-off storage circuit, means for applying binary numbers to said arithmetic unit from said source on an expanded scale with respect to said predetermined scale, means for applying binary signals from said round-off information storage circuit to said adder for addition to the number in said arithmetic unit, means for deleting the less significant digits from the number in said arithmetic unit and for applying them to said round-off storage circuit, means for scaling down the remaining most significant digits of the number in said arithmetic unit, means for applying information from said sum storage circuit to said arithmetic unit and for adding it to the scaled down number retained in said arithmetic unit, and means for applying the modified sum to the sum storage means.

12. In an electrical circuit for performing successive computations on binary numbers having a sign bit and being represented in the fractional number system, an arithmetic unit including an adder, a source of input information, sum circuit means for storing numbers on a predetermined digital scale, a round-off storage circuit, means for applying binary numbers to said arithmetic unit from said source on an expanded scale with respect to said predetermined scale, means for applying binary signals from said round-off information storage circuit to said adder for addition to the number in said arithmetic unit, means for deleting the less significant digits from the number in said arithmetic unit and for applying them to said round-off storage circuit, means for scaling down the remaining most significant digits of the number in said arithmetic unit, means for filling in the more significant digit places of said scaled down number with the sign bit of said number, means for applying information from said sum storage circuit to said arithmetic unit and for adding it to the scaled down number retained in said arithmetic unit, and means for applying the modified sum to the sum storage means.

13. A circuit as defined in claim 12 wherein said arithmetic unit includes means for serially storing and circulating digital signals interconnecting the output the input of said adder, and wherein the scaling down circuitry includes means for reducing the storage capacity of said storage means by at least two digits.

References Cited in the file of this patent

UNITED STATES PATENTS 2,749,037 Stibitz ---------------- June 5, 1956

FOREIGN PATENTS 709,408 Great Britain ---------- May 26, 1954
749,836 Great Britain ----------- June 6, 1956